United States Patent Office 3,539,299
Patented Nov. 10, 1970

3,539,299
EXTRACTION OF HYDROCARBON GASES FROM EARTH SAMPLES
Robert R. Thompson, Tulsa, Okla., assignor to Pan American Petroleum Corporation, Tulsa, Okla., a corporation of Delaware
No Drawing. Filed Oct. 17, 1968, Ser. No. 768,517
Int. Cl. G01n 33/00, 33/24
U.S. Cl. 23—230                3 Claims

ABSTRACT OF THE DISCLOSURE

Earth samples are caused to release their content of hydrocarbon gases for analysis by treatment with a hot ethylenediamine tetraacetic acid solution preferably at a pH of about 7 or higher. Under these conditions, carbonate minerals are decomposed without creating the large volume of gaseous $CO_2$ that complicates the analysis when conventional strong-acid treatment is used.

BACKGROUND OF THE INVENTION

This invention relates to geochemical prospecting, and is directed to an improved treatment of earth samples to cause substantially complete release of hydrocarbon gases that may be present therein. More specifically, the invention is directed to a treatment of earth samples with a reagent that causes decomposition of carbonate minerals under conditions such that the desired hydrocarbons are released but little or no gaseous $CO_2$ is evolved.

In the analysis of earth samples for their hydrocarbon content, it has long been recognized that mechanical agitation, evacuation, and heating, or various combinations of these treatments are able to cause the release of only part of the hydrocarbons which may be present in the sample. Instead of or in addition to evacuation, heating, and agitation, it has accordingly been a conventional practice for many years to use solutions of strong acids, salts which have an acid reaction in water solution, acidic wetting agents, and the like, separately or in various combinations such that the carbonate minerals of the sample are decomposed, with the result that additional hydrocarbons are released and recovered for analysis. As such treatments normally cause the evolution of rather large volumes of $CO_2$ gas from reaction with the carbonate minerals commonly present in the earth samples, an essential part of the analysis procedure involves the handling and elimination of the evolved carbon dioxide. This adds appreciably to the work of making the analysis, plus increasing the possibility of error if the $CO_2$ removal is incomplete or if the strong reagents react with organic matter in the soil to decompose it into hydrocarbons and compounds that can be mistaken for hydrocarbons.

SUMMARY OF THE INVENTION

It has now been found that a solution of ethylenediamine tetraacetic acid, used at a pH of about 7 or higher and preferably heated, is a highly effective agent for releasing hydrocarbons from the minerals of an earth sample without releasing gaseous $CO_2$; and, compared to many procedures, there is a marked reduction in spurious hydrocarbons produced by the decomposition of organic matter. It appears that under the proper conditions, this treatment decomposes the carbonate minerals, which appear to be mainly responsible for holding the additional hydrocarbons that are released when the carbonates decompose, without formation of the large volumes of free $CO_2$ gas which accompany the conventional use of strong acid or acid-reacting salts. Under the conditions used, it appears that the calcium and other relatively insoluble carbonates form soluble carbonate salts, with the calcium and other metallic ions forming with the reagent complexes that retain them in solution.

DESCRIPTION OF THE PREFERRED EMBODIMENT

A presently preferred embodiment of my procedure is as follows: the ethylenediamine tetraacetic acid is preferably used in the form of a partial salt, such as disodium ethylenediamine tetraacetic acid, abbreviated herein as EDTA. A reagent solution is prepared by dissolving disodium-EDTA in distilled water in the ratio of about 10 grams of the salt per 100 milliliters of water, and 1 N sodium hydroxide solution is added to bring the pH of the reagent solution to about 7. To an earth sample of typical 5-gram weight in an appropriate container, such as a glass test tube provided with a stop-cock and a joint for connection to a vacuum system, is added about 100 milliliters of this EDTA reagent. The container is first immediately evacuated to a pressure of about 100 mm. of mercury, and is then closed, heated to and held at a temperature of about 80° C. for a period of time, at least about six hours and typically overnight. The length of time the sample and container contents are held at the elevated temperature is not critical as long as it is sufficient for decomposition of the insoluble carbonates, as essentially all of the trapped hydrocarbons are then freed for analysis. Additional heating time does no harm, however, either to the released hydrocarbons or to the other materials of the sample, nor does it appear to have any benefit of further hydrocarbon release or increased accuracy in the hydrocarbon measurement. Raising the level of heating above 80° C. raises the rate of carbonate decomposition and hydrocarbon release, but is not advisable because of the possible decomposition of organic matter into spurious hydrocarbons. At the end of the heating period, the container and contents are cooled, attached to the evacuated measuring system, typically a flame ionization chromatograph, the stop-cock is opened to the analyzer sample inlet system, and any hydrocarbons present in the vapor space of the container are drawn through the analyzer and measured.

While the above represents the preferred procedure for using my invention, a more rapid release of the hydrocarbons may be obtained by operating at a pH somewhat under 7. A pH value as low as 3 may be used, but the gain in shorter release time is in some degree offset by the lower solubility of the EDTA, giving a weaker reagent solution. Also, as the pH is lowered, gaseous $CO_2$ will be released, which must be handled by the analytical equipment or removed before hydrocarbon measurement; but except at the lowest pH values the amount will ordinarily be much less than occurs with the conventional strong-acid treatment, when the volume of $CO_2$ may be many times that of the hydrocarbons obtained. Above pH 7 the reaction proceeds progressively more slowly, although it is then possible to use a more concentrated reagent solution, due to increased solubility of the EDTA, to offset in some degree the slower reaction rate.

As compared with the conventional strong-acid treatment, about the only disadvantage of the present treatment is the longer time required for the release of the hydrocarbon gases. The extraction apparatus, consisting essentially only of a glass bulb provided with a stop-cock and vacuum joint for connection to the analytical apparatus, is simpler and less expensive than the acid-treatment apparatus, and the reagent itself is non-hazardous to handle compared with acids. Accordingly, the present procedure is quite adaptable to field use where the treatment of each sample is begun as soon as it is secured, and can be allowed to proceed to completion without further operator attention, as compared to the strong-acid procedure which requires more extensive and expensive apparatus and closer attention by an operator due to the potentially large evolution of $CO_2$ gas.

No particular accuracy of measurement of the ratio of reagent to soil sample is required, though if it is likely that the content of carbonate of the sample may exceed about 15 percent, then a correspondingly larger ratio of reagent than the 100 milliliters per 5 grams of sample should be used. Comparison of the hydrocarbon release procedure of the present invention with the standard strong-acid treatment on duplicate samples has shown that the present procedure consistently releases from 94 to 99½ percent of the significant hydrocarbon gases present in the soil samples.

Having described my invention in terms of the foregoing specific embodiment, further modifications and procedures will now be apparent to those skilled in the geochemical art. Accordingly, my invention should be considered as limited only by the following claims.

I claim:
1. The method of treating an earth sample to cause the release of gaseous hydrocarbons contained within said sample which comprises the steps of
    enclosing said sample in a container,
    adding to said container and sample a sufficient volume of ethylenediamine tetraacetic acid solution at a pH of at least about 3, to decompose substantially all the carbonates of said sample,
    partially evacuating, then closing said container,
    maintaining said closed container and contents at an elevated temperature until substantially all of the carbonate minerals of said sample are decomposed, and transferring the gaseous atmosphere of said container to a gas-analyzing system.

2. The method of claim 1 in which said solution contains disodium ethylenediamine tetraacetic acid in the ratio of about 10 grams per 100 ml. and sufficient sodium hydroxide solution to produce a pH of at least about 7, and said solution is added to said container and sample in the ratio of at least about 100 ml. per 5 grams of sample.

3. The method of claim 2 in which said produced pH is about 7 and said temperature-maintaining step comprises holding said container and contents at about 80° C. for at least about six hours.

References Cited

UNITED STATES PATENTS

| | | | |
|---|---|---|---|
| 2,272,645 | 2/1942 | Rosaire | 23—232 |
| 2,330,717 | 9/1943 | Horvitz. | |
| 2,336,612 | 12/1943 | Horvitz. | |
| 2,868,625 | 1/1959 | Frank. | |
| 3,252,082 | 5/1966 | Hiller | 324—0.5 |

OTHER REFERENCES

Viro: "Use of Ethylenediamine Tetraacetic Acid in Soil Analysis," Chem. Abs., v. 49: 16293i (1955).

JOSEPH SCOVRONEK, Primary Examiner

D. G. CONLIN, Assistant Examiner

U.S. Cl. X.R.

23—232